United States Patent
Furuya et al.

(10) Patent No.: US 11,508,370 B2
(45) Date of Patent: Nov. 22, 2022

(54) ON-BOARD AGENT SYSTEM, ON-BOARD AGENT SYSTEM CONTROL METHOD, AND STORAGE MEDIUM

(71) Applicant: HONDA MOTOR CO., LTD., Tokyo (JP)

(72) Inventors: Sawako Furuya, Wako (JP); Yoshifumi Wagatsuma, Wako (JP); Hiroki Nakayama, Wako (JP); Kengo Naiki, Wako (JP); Yusuke Oi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 16/807,250

(22) Filed: Mar. 3, 2020

(65) Prior Publication Data
US 2020/0320996 A1 Oct. 8, 2020

(30) Foreign Application Priority Data

Mar. 7, 2019 (JP) .............................. JP2019-041564

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/08* (2013.01); *G10L 15/26* (2013.01); *G10L 2015/088* (2013.01); *H04W 4/40* (2018.02)

(58) Field of Classification Search
CPC ....... G10L 15/08; G10L 15/022; G10L 15/26; G10L 15/22; H04W 4/40; G06F 3/167
See application file for complete search history.

(56) References Cited

U.S. PATENT DOCUMENTS 6,947,895 B1* 9/2005 Shanmugham ......... G10L 15/28
704/E15.046
7,693,720 B2* 4/2010 Kennewick ......... G06F 16/3329
704/270.1
(Continued)

FOREIGN PATENT DOCUMENTS

JP 2003-174497 6/2003
JP 2006-188098 7/2006
(Continued)

OTHER PUBLICATIONS

Japanese Office Action for Japanese Patent Application No. 2019-041564 dated Sep. 27, 2022.

*Primary Examiner* — Daniel C Washburn
*Assistant Examiner* — Oluwadamilola M Ogunbiyi
(74) *Attorney, Agent, or Firm* — Amin, Turocy & Watson, LLP

(57) ABSTRACT

An on-board agent system includes: a plurality of agent functional units, each of the plurality of agent functional units being configured to provide a service including outputting a response using voice to an output unit according to an utterance of an occupant of a vehicle; and a common operator configured to be shared by the plurality of agent functional units and provided in the vehicle, wherein, when an operation is executed on the common operator with an operation pattern set to correspond to each of the plurality of agent functional units, an agent functional unit corresponding to the operation pattern of the executed operation is activated.

4 Claims, 14 Drawing Sheets

(51) Int. Cl.
*G10L 15/26* (2006.01)
*H04W 4/40* (2018.01)

(56) References Cited

U.S. PATENT DOCUMENTS

| | | | | |
|---|---|---|---|---|
| 8,229,750 | B2* | 7/2012 | Creamer | G10L 15/22 704/270.1 |
| 10,860,722 | B2* | 12/2020 | Usuba | G06F 21/577 |
| 2002/0049805 | A1* | 4/2002 | Yamada | H04M 3/4938 709/202 |
| 2002/0073176 | A1* | 6/2002 | Ikeda | G06F 16/951 709/204 |
| 2002/0173333 | A1* | 11/2002 | Buchholz | H04W 4/00 455/527 |
| 2003/0088422 | A1* | 5/2003 | Denenberg | G10L 15/28 704/275 |
| 2004/0193420 | A1* | 9/2004 | Kennewick | G06F 16/3329 704/270.1 |
| 2017/0329590 | A1* | 11/2017 | Owen | G06F 8/60 |
| 2019/0034325 | A1* | 1/2019 | Yokoyama | G06F 11/3688 |
| 2020/0089531 | A1* | 3/2020 | Kuwahara | G06Q 10/0631 |
| 2020/0090504 | A1* | 3/2020 | Kadar | G08G 1/0129 |
| 2020/0219485 | A1* | 7/2020 | Chen | G10L 15/28 |
| 2020/0320996 | A1* | 10/2020 | Furuya | G10L 15/22 |
| 2022/0075793 | A1* | 3/2022 | Jezewski | G06F 16/245 |

FOREIGN PATENT DOCUMENTS

| | | | | |
|---|---|---|---|---|
| JP | 2006-335231 | | 12/2006 | |
| JP | 2008-003517 | | 1/2008 | |
| JP | 2009-175908 | | 8/2009 | |
| JP | 2018-021987 | | 2/2018 | |
| JP | 2021092651 | A * | 6/2021 | B60K 37/06 |

* cited by examiner

FIG. 12

| STORAGE | AGENT THAT IS ACTIVATION TARGET | OPERATION PATTERN OF COMMON OPERATOR |
|---|---|---|
| FIRST STORAGE REGION | AGENT 1 | "HALF PRESS" |
| SECOND STORAGE REGION | AGENT 2 | "LONG PRESS" |
| THIRD STORAGE REGION | AGENT 3 | "TWO-TIME" PRESS |

SETTING OPERATION FOR ACTIVATION OF EACH AGENT ⇒

| STORAGE | AGENT THAT IS ACTIVATION TARGET | OPERATION PATTERN OF COMMON OPERATOR |
|---|---|---|
| FIRST STORAGE REGION | AGENT 1 | "LONG PRESS" |
| SECOND STORAGE REGION | AGENT 2 | "HALF PRESS" |
| THIRD STORAGE REGION | AGENT 3 | "TWO-TIME" PRESS |

ON-BOARD AGENT SYSTEM, ON-BOARD AGENT SYSTEM CONTROL METHOD, AND STORAGE MEDIUM

CROSS-REFERENCE TO RELATED APPLICATION

Priority is claimed on Japanese Patent Application No. 2019-041564, filed Mar. 7, 2019, the content of which is incorporated herein by reference.

BACKGROUND

Field of the Invention

The present invention relates to an on-board agent system, an on-board agent system control method, and a storage medium.

Description of Related Art

A conventional technology related to an agent function of providing information about driving assistance, vehicle control, other applications, and the like at the request of an occupant of a vehicle while conversing with the occupant has been disclosed (Japanese Unexamined Patent Application, First Publication No. 2006-335231).

SUMMARY

Although a technology of mounting a plurality of agent functions in a vehicle has been put to practical use in recent years, how to provide a method of activating respective agent functions has not been sufficiently studied. Accordingly, there are cases in which operations of an occupant are complicated and convenience is insufficient in the conventional technology.

An object of the present invention devised in view of such circumstances is to provide an on-board agent system, an on-board agent system control method, and a storage medium which can improve convenience.

An on-board agent system, an on-board agent system control method, and a storage medium according to the present invention employ configurations described below.

(1): An on-board agent system according to an aspect of the present invention includes: a plurality of agent functional units, each of the plurality of agent functional units being configured to provide a service including outputting a response using voice to an output unit according to an utterance of an occupant of a vehicle; and a common operator configured to be shared by the plurality of agent functional units and provided in the vehicle, wherein, when an operation is executed on the common operator with an operation pattern set to correspond to each of the plurality of agent functional units, an agent functional unit corresponding to the operation pattern of the executed operation is activated.

(2): In the aspect of (1), the on-board agent system further includes a manager configured to control activation of each of the plurality of agent functional units, wherein, when an operation is executed on the common operator, the manager activates an agent functional unit corresponding to the executed operation pattern.

(3): In the aspect of (2), when an operation of setting an operation pattern of the common operator for activation of each agent functional unit is executed, the manager causes a storage to store association information in which the set operation pattern is associated with an agent functional unit which is an activation target, and when an operation is executed on the common operator, identifies an agent functional unit corresponding to an operation pattern of the executed operation with reference to the association information stored in the storage.

(4): In the aspect of (2), when an operation is executed on the common operator, the manager activates an agent functional unit corresponding to an operation pattern of the executed operation even when an agent functional unit other than the agent functional unit corresponding to the operation pattern of the executed operation is activated.

(5): In the aspect of (2), when an operation is executed on the common operator while any of the plurality of agent functional units is outputting voice, the manager stores an utterance of the occupant of the vehicle in a storage, and an agent functional unit activated according to the operation executed on the common operator executes a process according to the utterance of the occupant of the vehicle acquired from the storage.

(6): In the aspect of (1), when an operation has been executed on the common operator, each of the plurality of agent functional units collates an operation pattern set to correspond to each agent functional unit with an operation pattern of the executed operation and activates on condition that collation is established.

(7): In the aspect of (6), when an operation of setting an operation pattern of the common operator for activation of each of the plurality of agent functional units is executed, each of the plurality of agent functional unit stores information about the set operation pattern in a storage, and when an operation is executed on the common operator, determines whether to activate with reference to the information about the operation pattern stored in the storage.

(8): An on-board agent system control method, performed by a computer, according to another aspect of the present invention includes: activating any of a plurality of agent functional units; providing a service including outputting a response using voice to an output unit according to an utterance of an occupant of a vehicle as a function of the activated agent functional unit; and, when an operation is executed on a common operator with an operation pattern set to correspond to each of the plurality of agent functional units, activating an agent functional unit corresponding to the operation pattern of the executed operation.

(9): A storage medium according to still another aspect of the present invention is a storage medium storing a program causing a computer to execute: a process of activating any of a plurality of agent functional units; a process of providing a service including outputting a response using voice to an output unit according to an utterance of an occupant of a vehicle as a function of the activated agent functional unit; and a process of, when an operation is executed on a common operator with an operation pattern set to correspond to each of the plurality of agent functional units, activating an agent functional unit corresponding to the operation pattern of the executed operation.

According to the aforementioned aspects of (1) to (9), it is possible to improve convenience.

BRIEF DESCRIPTION OF THE DRAWINGS

FIG. 12 is a diagram for describing an example of association information for each storage region stored in a storage.

DESCRIPTION OF EMBODIMENTS

Hereinafter, embodiments of an on-board agent system, an on-board agent system control method, and a storage medium of the present invention will be described with reference to the drawings. An on-board agent system is a system for realizing a part or all of an agent system. As an example, a case in which an on-board agent system includes an agent apparatus which is mounted in a vehicle (hereinafter, a vehicle M) (is in a state in which it can be used in a vehicle) and includes a plurality of types of agent functions and an interface device through which input or output of various types of information is performed with respect to the agent apparatus will be described below. An agent function is, for example, a function of providing various types of information based on a request (command) included in an utterance of an occupant of the vehicle M or mediating network services while conversing with the occupant. A plurality of types of agents may have different functions, processing procedures, controls, output forms, and details respectively applied thereto. Agent functions may include a function of performing control of an apparatus in a vehicle (e.g., an apparatus with respect to driving control or vehicle body control).

An agent function is realized, for example, using a natural language processing function (a function of understanding the structure and meaning of text), a conversation management function, a network search function of searching for other apparatuses through a network or searching for a predetermined database of a host apparatus, and the like in addition to an voice recognition function of recognizing voice of an occupant (a function of converting voice into text) in an integrated manner. Some or all of these functions may be realized by artificial intelligence (AI) technology. A part of a configuration for executing these functions (particularly, the voice recognition function and the natural language processing and interpretation function) may be mounted in an agent server (external device) which can communicate with an on-board communication device of the vehicle M or a general-purpose communication device included in the vehicle M. The following description is based on the assumption that a part of the configuration is mounted in an agent server and an agent apparatus and the agent server realize an agent system in cooperation. An entity that provides a service (service entity) caused to virtually appear by the agent apparatus and the agent server in cooperation is referred to as an agent.

<Overall Configuration>

Figure 1:
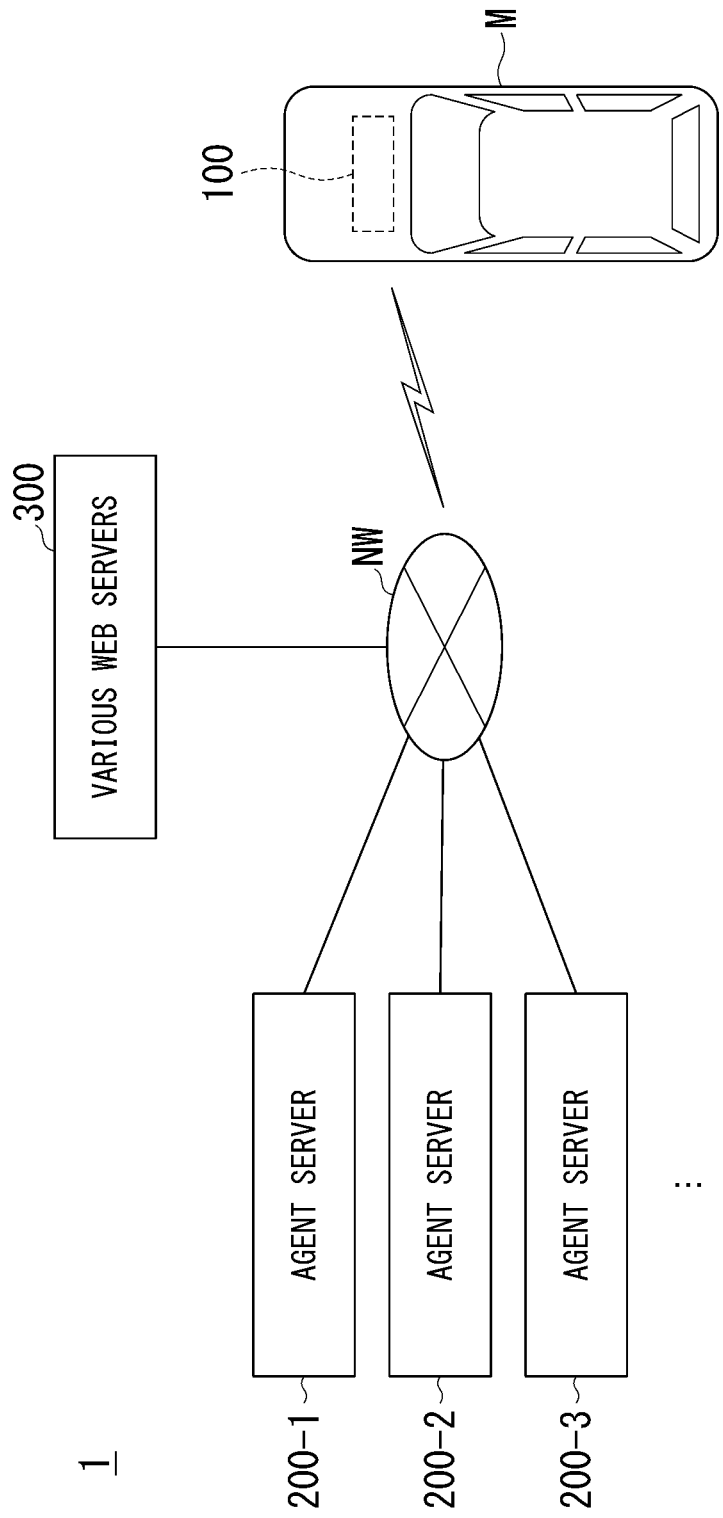
FIG. 1 is a diagram illustrating a configuration of an agent system including an agent apparatus.

FIG. 1 is a configuration diagram of an agent system 1 including an agent apparatus 100. The agent system 1 includes, for example, the agent apparatus 100 and a plurality of agent servers 200-1, 200-2, 200-3, . . . . Numerals following the hyphens at the ends of reference numerals are identifiers for distinguishing agents. When agent servers are not distinguished, the agent servers may be simply referred to as an agent server 200. Although three agent servers 200 are illustrated in FIG. 1, the number of agent servers 200 may be two, four or more. The agent servers 200 are managed by different agent system providers. Accordingly, agents in the present invention are agents realized by different providers. For example, automobile manufacturers, network service providers, electronic commerce subscribers, cellular phone vendors and manufacturers, and the like may be conceived as providers, and any entity (a corporation, an organization, an individual, or the like) may become an agent system provider.

The agent apparatus 100 communicates with the server device 200 via a network NW. The network NW includes, for example, some or all of the Internet, a cellular network, a Wi-Fi network, a wide area network (WAN), a local area network (LAN), a public line, a telephone line, a wireless base station, and the like. Various web servers 300 are connected to the network NW, and the agent server 200 or the agent apparatus 100 can acquire web pages from the various web servers 300 via the network NW.

The agent apparatus 100 makes a conversation with an occupant of the vehicle M, transmits voice from the occupant to the agent server 200 and presents a response acquired from the agent server 200 to the occupant in the form of voice output or image display.

First Embodiment

[Vehicle]

Figure 2:
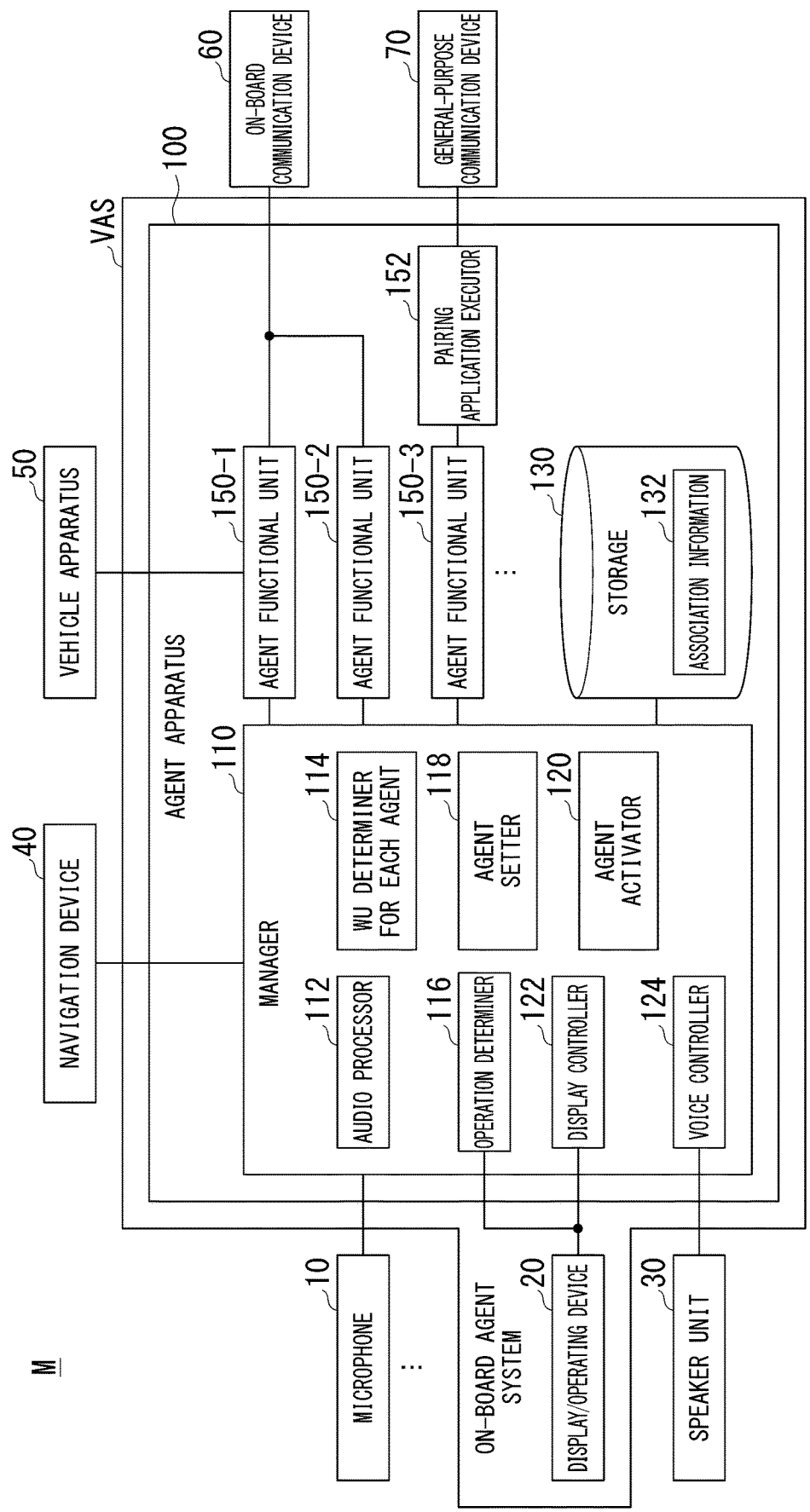
FIG. 2 is a diagram illustrating a configuration of an on-board agent system according to a first embodiment and apparatuses mounted in a vehicle.

FIG. 2 is a diagram illustrating a configuration of an on-board agent system VAS according to a first embodiment and apparatuses mounted in the vehicle M. The vehicle M includes, for example, one or more microphones 10, a display/operating device 20, a speaker unit 30, a navigation device 40, a vehicle apparatus 50, an on-board communication device 60, and the agent apparatus 100 mounted therein. The on-board agent system VAS includes, for example, the display/operating device 20 and the agent apparatus 100. There are cases in which a general-purpose communication device 70 such as a smartphone is included in a vehicle cabin and used as a communication device. Such devices are connected to each other through a multiplex communication line such as a controller area network (CAN) communication line, a serial communication line, a wireless communication network, or the like. The components illustrated in FIG. 2 are merely an example and some of the components may be omitted or other components may be further added.

The microphone 10 is an audio collector for collecting voice generated in the vehicle cabin. The display/operating device 20 is a device (or a group of devices) which can display images and receive an input operation. The display/operating device 20 includes, for example, a display device configured as a touch panel. Further, the display/operating device 20 may include a head up display (HUD) or a mechanical input device. The speaker unit 30 includes, for example, a plurality of speakers (voice output units) provided at different positions in the vehicle cabin. The display/operating device 20 may be shared by the agent apparatus 100 and the navigation device 40. This will be described in detail later.

The navigation device 40 includes a positioning device such as a navigation human machine interface (HMI) or a global positioning system (GPS), a storage device which stores map information, and a control device (navigation controller) which performs route search and the like. Some or all of the microphone 10, the display/operating device 20, and the speaker unit 30 may be used as an HMI. The navigation device 40 searches for a route (navigation route) for moving to a destination input by an occupant from a position of the vehicle M identified by the positioning device and outputs guide information using the navigation HMI such that the vehicle M can travel along the route. The route search function may be included in a navigation server accessible through the network NW. In this case, the navigation device 40 acquires a route from the navigation server and outputs guide information. The agent apparatus 100 may be constructed on the basis of the navigation controller. In this case, the navigation controller and the agent apparatus 100 are integrated in hardware.

The vehicle apparatus 50 includes, for example, a driving power output device such as an engine and a motor for traveling, an engine starting motor, a door lock device, a door opening/closing device, windows, a window opening/closing device, window opening/closing control device, seats, a seat position control device, a room mirror, a room mirror angle and position control device, illumination devices inside and outside the vehicle, illumination device control devices, wipers, a defogger, wiper and defogger control devices, winkers, a winker control device, an air-conditioning device, devices with respect to vehicle information such as information on a mileage and a tire pressure and information on the quantity of remaining fuel, and the like.

The on-board communication device 60 is, for example, a wireless communication device which can access the network NW using a cellular network or a Wi-Fi network.

Figure 3:
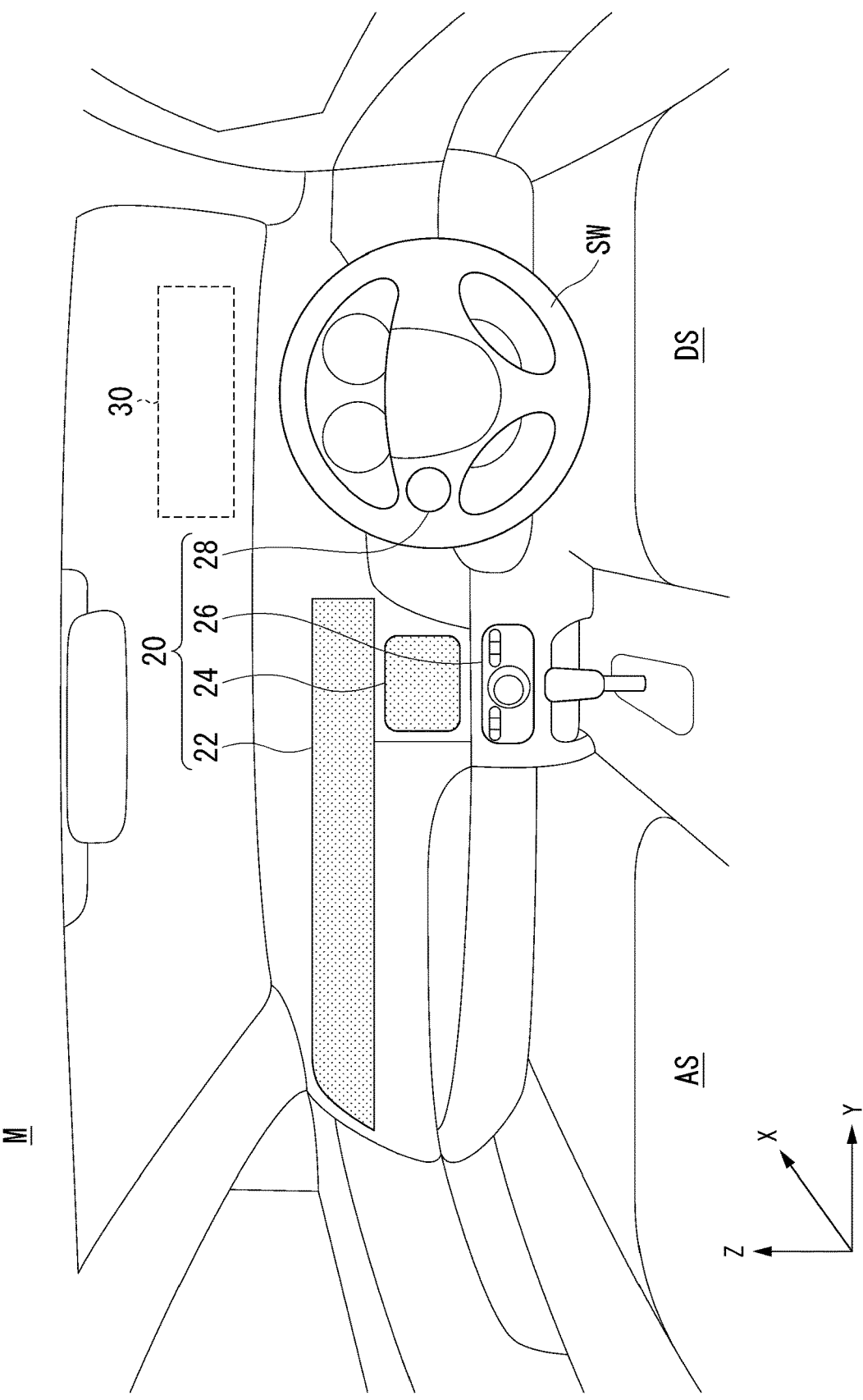
FIG. 3 is a diagram illustrating an arrangement example of a display/operating device.

FIG. 3 is a diagram illustrating an arrangement example of the display/operating device 20. The display/operating device 20 may include a first display 22, a second display 24, an operation switch assembly 26, and a steering switch 28, for example. The display/operating device 20 may further include an HUD 30.

The vehicle M includes, for example, a driver's seat DS in which a steering wheel SW is provided, and a passenger seat AS provided in a vehicle width direction (Y direction in the figure) with respect to the driver's seat DS. The first display 22 is a laterally elongated display device extending from the vicinity of the middle region of an instrument panel between the driver's seat DS and the passenger seat AS to a position facing the left end of the passenger seat AS. The second display 24 is provided in the vicinity of the middle region between the driver's seat DS and the passenger seat AS in the vehicle width direction under the first display. For example, the first display 22 and the second display 24 are configured as touch panels and include a liquid crystal display (LCD), an organic electroluminescence (organic EL) display, a plasma display, or the like as a display. The operation switch assembly 26 is an assembly of dial switches, button type switches, and the like. The steering switch 28 is a button type switch, for example, and can detect a pressed operation amount. The steering switch 28 may be a toggle switch by which a plurality of modes can be switched. The steering switch 28 is provided in the steering wheel SW of the vehicle M. The steering switch 28 is an example of a "common operator". The display/operating device 20 outputs details of an operation performed by an occupant to the agent apparatus 100. Details displayed by the first display 22 or the second display 24 may be determined by the agent apparatus 100.

[Agent Apparatus]

Referring back to FIG. 2, the agent apparatus 100 includes a manager 110, agent functional units 150-1, 150-2 and 150-3, and a pairing application executer 152. The manager 110 includes, for example, an audio processor 112, a wake-up (WU) determiner 114 for each agent, an operation determiner 116, an agent setter 118, an agent activator 120, a display controller 122, a voice controller 124, and a storage 130. When the agent functional units are not distinguished, they are simply referred to as an agent functional unit 150. Illustration of three agent functional units 150 is merely an example in which they correspond to the number of the agent servers 200 in FIG. 1 and the number of agent functional units 150 may be two, four or more. Software arrangement in FIG. 2 is illustrated in a simplified manner for description and can be arbitrarily modified, for example, such that the manager 110 may be interposed between the agent functional unit 150 and the on-board communication device 60 in practice.

Each component other than the storage 130 of the agent apparatus 100 is realized, for example, by a hardware processor such as a central processing unit (CPU) executing a program (software). Some or all of these components may be realized by hardware (circuit including circuitry) such as a large scale integration (LSI) circuit, an application specific integrated circuit (ASIC), a field-programmable gate array (FPGA) or a graphics processing unit (GPU) or realized by software and hardware in cooperation. The program may be stored in advance in a storage device (storage device including a non-transitory storage medium) such as a hard disk drive (HDD) or a flash memory or stored in a separable storage medium (non-transitory storage medium) such as a DVD or a CD-ROM and installed when the storage medium is inserted into a drive device. The storage 130 is realized by an HDD, a flash memory, a random access memory (RAM), and the like. The storage 130 stores association information 132 in which an operation pattern of the steering switch 28 is associated with an agent functional unit 150 that is an activation target.

The manager 110 functions according to execution of an operating system (OS) or a program such as middleware.

The audio processor 112 of the manager 110 detects an utterance of an occupant of the vehicle M when the utterance of the occupant of the vehicle M is input through the microphone 10. Then, the audio processor 112 performs audio processing on the input utterance of the occupant of the vehicle M such that the utterance becomes a state in which it is suitable to recognize a wake-up word preset for each agent.

The WU determiner 114 for each agent is present corresponding to each of the agent functional units 150-1, 150-2 and 150-3 and recognizes a wake-up word predetermined for each agent. The WU determiner 114 for each agent recognizes, from voice on which audio processing has been performed (voice stream), the meaning of the voice. First, the WU determiner 114 for each agent detects a voice section on the basis of amplitudes and zero crossing of voice waveforms in the voice stream. The WU determiner 114 for each agent may perform section detection based on voice recognition and non-voice recognition in units of frames based on Gaussian mixture model (GMM).

Subsequently, the WU determiner 114 for each agent converts the voice in the detected voice section into text to obtain text information. Then, the WU determiner 114 for each agent determines whether the text information corresponds to a wake-up word. When it is determined that the text information corresponds to a wake-up word, the WU determiner 114 for each agent notifies the agent activator 120 that there is an activation instruction for a corresponding agent functional unit 150. The function corresponding to the WU determiner 114 for each agent may be mounted in the agent server 200. In this case, the manager 110 transmits the voice stream on which audio processing has been performed by the audio processor 112 to the agent server 200, and when the agent server 200 determines that the voice stream is a wake-up word, the agent functional unit 150 is activated according to instruction from the agent server 200. Each agent functional unit 150 may be constantly activated and perform determination of a wake-up word by itself. In this case, the manager 110 need not include the WU determiner 114 for each agent.

The agent functional unit 150 causes an agent to appear in cooperation with the agent server 200 corresponding thereto to provide a service including a response using voice according to an utterance of the occupant of the vehicle. The agent functional unit 150 may include one authorized to control the vehicle apparatus 50. The agent functional unit 150 may include one that cooperates with the general-purpose communication device 70 via the pairing application executer 152 and communicates with the agent server 200. For example, the agent functional unit 150-1 is authorized to control the vehicle apparatus 50. The agent functional unit 150-1 communicates with the agent server 200-1 via the on-board communication device 60. The agent functional unit 150-2 communicates with the agent server 200-2 via the on-board communication device 60. The agent functional unit 150-3 cooperates with the general-purpose communication device 70 via the pairing application executer 152 and communicates with the agent server 200-3. The pairing application executer 152 performs pairing with the general-purpose communication device 70 according to Bluetooth (registered trademark), for example, and connects the agent functional unit 150-3 to the general-purpose communication device 70. The agent functional unit 150-3 may be connected to the general-purpose communication device 70 according to wired communication using a universal serial bus (USB) or the like. Hereinafter, an agent caused to appear by the agent functional unit 150-1 and the agent server 200-1 in cooperation may be referred to as agent 1, an agent caused to appear by the agent functional unit 150-2 and the agent server 200-2 in cooperation may be referred to as agent 2, and an agent caused to appear by the agent functional unit 150-3 and the agent server 200-3 in cooperation may be referred to as agent 3.

The operation determiner 116 determines whether the occupant of the vehicle M operates the steering switch 28 on the basis of an operation signal input from the steering switch 28. When the steering switch 28 is operated with a plurality of operation patterns, the operation determiner 116 determines the operation patterns of the steering switch 28 on the basis of different operation signals for the respective operation patterns. For example, "half press", "long press", "two-time press", "switch", "simultaneous press" of a plurality of steering switches 28, and the like may be conceived as a plurality of operation patterns. The operation determiner 116 identifies an agent functional unit 150 that is an activation target with reference to the association information 132 stored in the storage 130 on the basis of a determined operation pattern of the steering switch 28. The operation determiner 116 notifies the agent activator 120 that there is an activation instruction for the identified agent functional unit 150. The steering switch 28 is not necessarily provided in the steering SW and may be appropriately provided at a position in the vehicle M at which the occupant can easily use it during driving.

The agent setter 118 changes the association information 132 stored in the storage 130 when the occupant of the vehicle M has performed a setting operation for activating each agent. When a voice for designating an agent that is an activation target is input immediately after the steering switch 28 has been operated with a predetermined operation pattern, for example, the agent setter 118 changes the association information 132 such that the predetermined operation pattern of the steering switch 28 is associated with the agent designated as the activation target.

Figure 4:
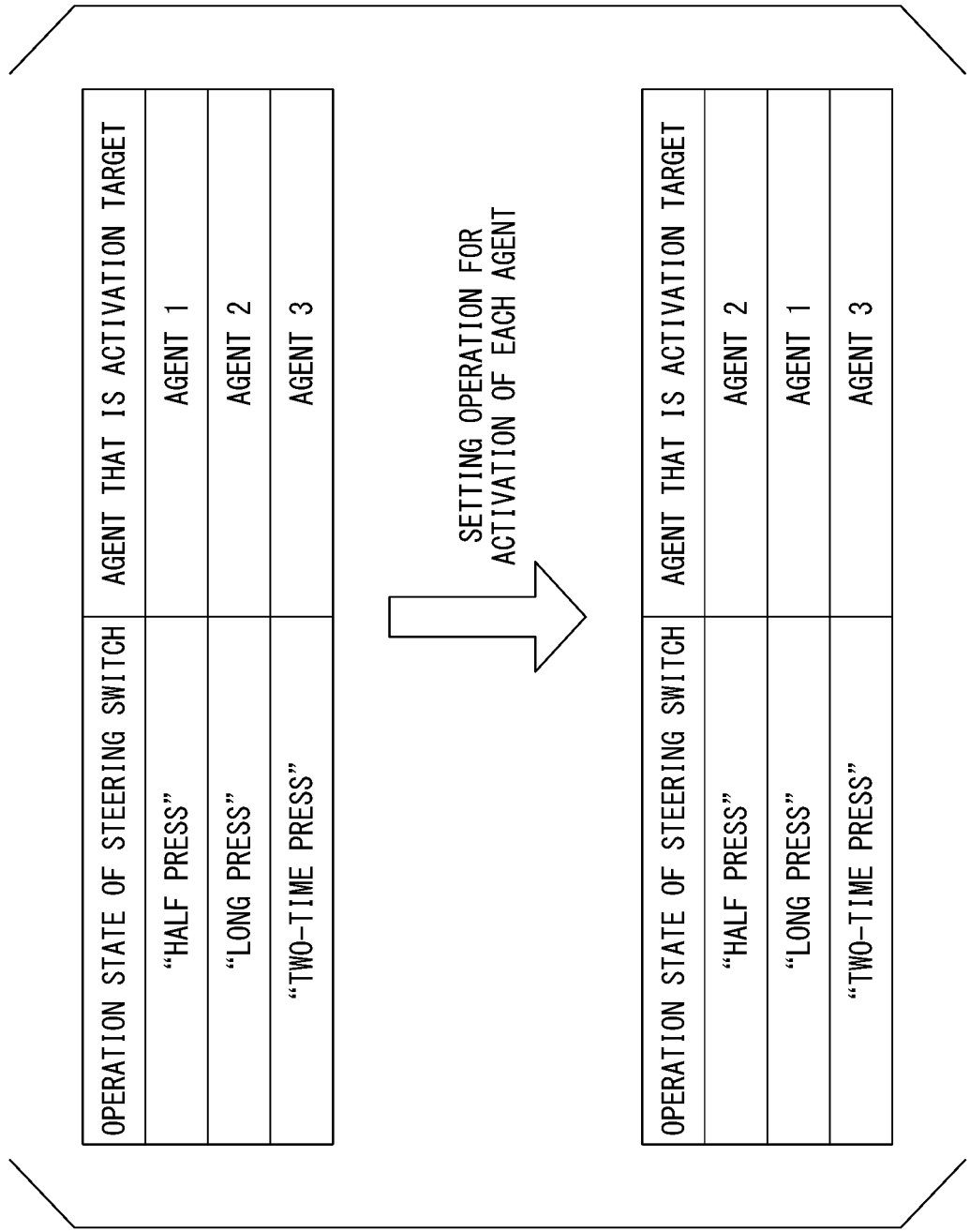
FIG. 4 is a diagram for describing an example of association information stored in a storage.

FIG. 4 is a diagram for describing an example of the association information 132 stored in the storage 130. In the example illustrated in this figure, "agent 1" is associated as an agent that is an activation target with an operation pattern of "half press" with respect to the steering switch 28 before a setting operation for activation of each agent is performed. "Agent 2" is associated as an agent that is an activation target with an operation pattern of "long press" with respect to the steering switch 28. "Agent 3" is associated as an agent that is an activation target with an operation pattern of "two-time press" with respect to the steering switch 28. In addition, in the example illustrated in this figure, as an example of the setting operation for activation of each agent, "agent 1" is designated as an agent that is an activation target for the operation pattern of "long press" with respect to the steering switch 28. In this case, "agent 1" is associated as an agent that is an activation target with the operation pattern of "long press" with respect to the steering switch 28. "Agent 2" that has been associated with the operation pattern of "long press" with respect to the steering switch 28 before the setting operation is performed is associated with the operation pattern of "half press" with respect to the steering switch 28 which has been dissociated from "agent 1".

The agent activator 120 controls activation of the plurality of agent functional units 150-1, 150-2 and 150-3. The agent activator 120 activates a corresponding agent functional unit when there is a notification from the WU determiner 114 for each agent and when there is a notification from the operation determiner 116.

When the operation determiner 116 determines an operation pattern of the steering switch 28, the agent activator 120 activates an agent functional unit 150 corresponding to the determined operation pattern. In this case, the agent activator 120 activates the agent functional unit corresponding to the operation pattern determined by the operation determiner 116 even during activation of an agent functional unit other than the agent functional unit corresponding to the operation pattern determined by the operation determiner 116. The agent activator 120 activates the agent functional unit 150-2, for example, when the operation determiner 116 determines the operation pattern of the steering switch 28 corresponding to the agent functional unit 150-2 during activation of the agent functional unit 150-1. That is, when the operation determiner 116 successively determines a plurality of types of operation patterns, the agent activator 120 activates agent functional units 150 corresponding to the plurality of types of operation patterns in parallel.

The agent functional unit 150 stores an utterance of the occupant of the vehicle M in the storage 130 when an operation is performed on the steering switch 28 while any of the plurality of agent functional units is outputting voice through the speaker unit 30. The agent functional unit 150 activated according to the operation performed on the steering switch 28 acquires an utterance of the occupant of the vehicle M from the storage 130 and provides a service including a response using voice. When operations are performed on the steering switch 28 with operation patterns corresponding to the plurality of agent functional units 150, utterances of the occupant of the vehicle M stored in the storage 130 by the plurality of agent functional units 150 may be an utterance shared among the plurality of agent functional units 150 or different utterances for the respective agent functional units 150. When the plurality of agent functional units 150 store an utterance of the occupant of the vehicle M in the storage 130, for example, a series of utterances input by the occupant of the vehicle M may be divided into a plurality of voice sections and utterances of the voice sections may be respectively allocated to the plurality of agent functional units 150. In this case, the utterances of the voice sections may be respectively allocated to the agent functional units 150 in the order of activation of the agent functional units 150, for example.

The display controller 122 causes the first display 22 or the second display 24 to display an image according to an instruction from the agent functional unit 150. It is assumed that the first display 22 is used in the following. The display controller 122 generates, for example, an image of a personified agent that communicates with the occupant in the vehicle cabin (hereinafter referred to as an agent image) according to control of a part of the agent functional units 150 and causes the first display 22 to display the generated agent image. The agent image may be, for example, an image in the form of speaking to the occupant. The agent image may include, for example, a face image from which at least an observer (occupant) can recognize an expression or a face orientation. For example, the agent image may have parts imitating eyes and a nose at the center of the face region such that an expression or a face orientation is recognized on the basis of the positions of the parts at the center of the face region. The agent image may be three-dimensionally perceived such that the face orientation of the agent is recognized by including a head image in the three-dimensional space by the observer or may include an image of a body (body, hands and legs) such that an action, a behavior, a posture, and the like of the agent can be recognized. The agent image may be an animation image.

The voice controller 124 causes some or all speakers included in the speaker unit 30 to output voice according to an instruction from the agent functional unit 150. The voice controller 124 may perform control of locating a sound image of agent voice at a position corresponding to a display position of an agent image using a plurality of speaker unit 30. The position corresponding to the display position of the agent image is, for example, a position predicted to be perceived by the occupant as a position at which the agent image is talking in the agent voice, and specifically, is a position near the display position of the agent image. Locating a sound image is, for example, to determine a spatial position of a sound source perceived by the occupant by controlling the magnitude of sound transmitted to the left and right ears of the occupant.

[Agent Server]

Figure 5:
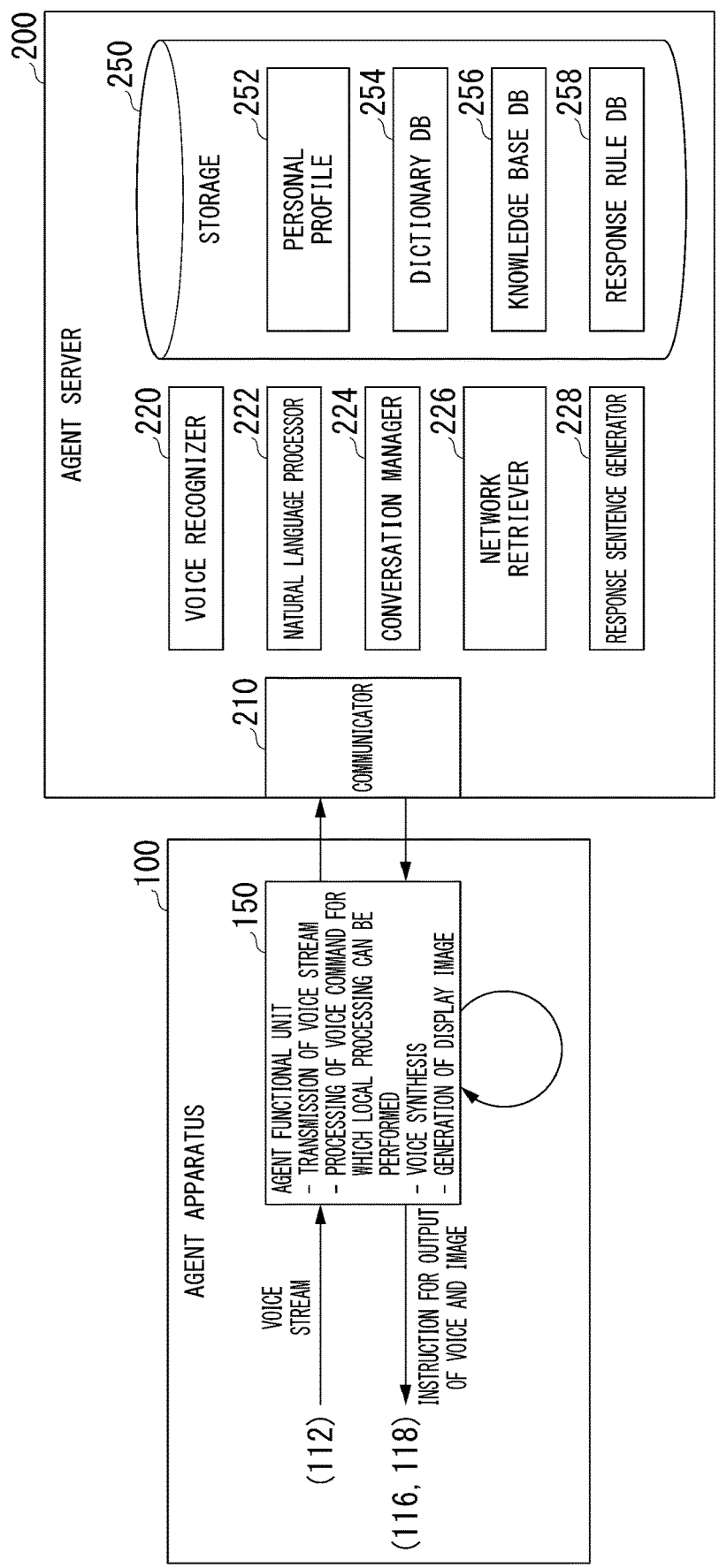
FIG. 5 is a diagram illustrating parts of a configuration of an agent server and a configuration of an agent apparatus.

FIG. 5 is a diagram illustrating parts of the configuration of the agent server 200 and the configuration of the agent apparatus 100. Hereinafter, the configuration of the agent server 200 and operations of the agent functional unit 150, and the like will be described. Here, description of physical communication from the agent apparatus 100 to the network NW will be omitted.

The agent server 200 includes a communicator 210. The communicator 210 is, for example, a network interface such as a network interface card (NIC). Further, the agent server 200 includes, for example, a voice recognizer 220, a natural language processor 222, a conversation manager 224, a network retriever 226, and a response sentence generator 228. These components are realized, for example, by a hardware processor such as a CPU executing a program (software). Some or all of these components may be realized by hardware (a circuit including circuitry) such as an LSI circuit, an ASIC, an FPGA or a GPU or realized by software and hardware in cooperation. The program may be stored in advance in a storage device (a storage device including a non-transitory storage medium) such as an HDD or a flash memory or stored in a separable storage medium (a non-transitory storage medium) such as a DVD or a CD-ROM and installed when the storage medium is inserted into a drive device.

The agent server 200 includes a storage 250. The storage 250 is realized by the various storage devices above-described. The storage 250 stores data and programs such as a personal profile 252, a dictionary database (DB) 254, a knowledge base DB 256, and a response rule DB 258.

In the agent apparatus 100, the agent functional unit 150 transmits a voice stream or a voice stream on which processing such as compression or encoding has been performed to the agent server 200. When a voice command which can cause local processing (processing performed without the agent server 200) to be performed is recognized, the agent functional unit 150 may perform processing requested through the voice command. The voice command which can cause local processing to be performed is a voice command to which a reply can be given by referring to a storage (not shown) included in the agent apparatus 100 or a voice command (e.g., a command for turning the air-conditioning device on, or the like) for controlling the vehicle apparatus 50 in the case of the agent functional unit 150-1. Accordingly, the agent functional unit 150 may include some functions of the agent server 200.

When the voice stream is acquired, the voice recognizer 220 performs voice recognition and outputs text information and the natural language processor 222 performs semantic interpretation on the text information with reference to the dictionary DB 254. The dictionary DB 254 is a DB in which abstracted semantic information is associated with text information. The dictionary DB 254 may include information on lists of synonyms. Steps of processing of the voice recognizer 220 and steps of processing of the natural language processor 222 are not clearly separated from each other and may affect each other in such a manner that the voice recognizer 220 receives a processing result of the natural language processor 222 and corrects a recognition result.

When a meaning such as "Today's weather" or "How is the weather today?" has been recognized as a recognition result, for example, the natural language processor 222 generates a command replacing standard text information of "today's weather". Accordingly, even when a request voice includes variations in text, it is possible to easily make a conversation suitable for the request. The natural language processor 222 may recognize the meaning of text information using artificial intelligence processing such as machine learning processing using probability and generate a command based on a recognition result, for example.

The conversation manager 224 determines details of an utterance for the occupant of the vehicle M with reference to the personal profile 252, the knowledge base DB 256 and the response rule DB 258 on the basis of the processing result (command) of the natural language processor 222. The personal profile 252 includes personal information, preferences, past conversation histories, and the like of occupants stored for each occupant. The knowledge base DB 256 is information defining relationships among objects. The response rule DB 258 is information defining operations (replies, details of apparatus control, or the like) that need to be performed by agents for commands.

The conversation manager 224 may identify an occupant by collating the personal profile 252 with feature information acquired from a voice stream. In this case, personal information is associated with the feature information of voice in the personal profile 252, for example. The feature information of voice is, for example, information about features of a talking manner such as a voice pitch, intonation and rhythm (tone pattern), and feature quantities according to mel frequency cepstrum coefficients and the like. The feature information of voice is, for example, information obtained by causing the occupant to utter a predetermined word, sentence, or the like when the occupant is initially registered and recognizing the uttered voice.

The conversation manager 224 causes the network retriever 226 to perform retrieval when the command is for requesting information that can be retrieved through the network NW. The network retriever 226 access the various web servers 300 via the network NW and acquires desired information. "Information that can be retrieved through the network NW" may be evaluation results of general users of a restaurant near the vehicle M or a weather forecast corresponding to the position of the vehicle M on that day, for example.

The response sentence generator 228 generates a response sentence and transmits the response sentence to the agent apparatus 100 such that details of the utterance determined by the conversation manager 224 are delivered to the occupant of the vehicle M. The response sentence generator 228 may generate a response sentence for calling the name of the occupant or in a speaking manner similar to the speaking manner of the occupant when the occupant has been identified as being registered in the personal profile.

When the agent functional unit 150 acquires the response sentence, the agent functional unit 150 instructs the voice controller 124 to perform voice synthesis and output voice. The agent functional unit 150 instructs the display controller 122 to display an image of an agent in accordance with the voice output. In this manner, an agent function in which an agent that has virtually appeared replies to the occupant of the vehicle M is realized.

[Processing Flow of Agent Apparatus]

Figure 6:
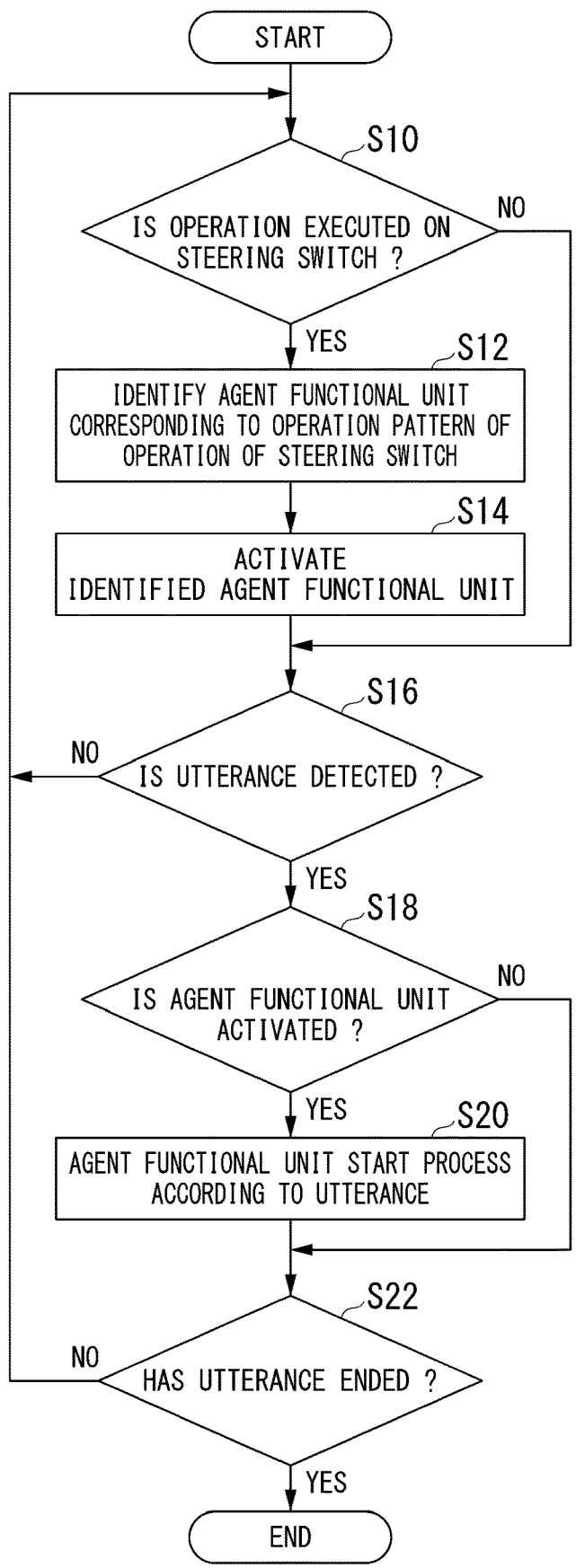
FIG. 6 is a flowchart for describing a flow of a series of processes of the on-board agent system according to the first embodiment.

Hereinafter, a flow of a series of processes of the on-board agent system VAS according to the first embodiment will be described using a flowchart. FIG. 6 is a flowchart for describing a flow of a series of processes of the on-board agent system VAS according to the first embodiment. Processes of this flowchart are started when activation of the agent functional unit 150 is stopped.

First, the operation determiner 116 determines whether an operation is performed on the steering switch 28 (step S10). The operation determiner 116 determines an operation pattern of the steering switch 28 when it is determined that an operation is performed on the steering switch 28. The operation determiner 116 identifies an agent functional unit 150 corresponding to the operation pattern of the steering switch 28 with reference to the association information 132 stored in the storage 130 (step S12). Then, the agent activator 120 activates the agent functional unit 150 identified by the operation determiner 116 on the basis of a notification from the operation determiner 116 (step S14). On the other hand, the operation determiner 116 proceeds to step S16 without performing the processes of step S12 to step S14 when it is determined that an operation is not performed on the steering switch 28. Subsequently, the audio processor 112 determines whether an utterance of the occupant of the vehicle M is detected on the basis of a voice signal input through the microphone 10 (step S16). The audio processor 112 returns to step S10 when it is determined that an utterance of the occupant of the vehicle M is not detected. Then, the operation determiner 116 determines whether a new operation is performed on the steering switch 28 (step S10). The operation determiner 116 identifies an agent functional unit 150 corresponding to a new operation pattern of the steering switch 28 with reference to the association information 132 stored in the storage 130 when it is determined that a new operation is performed on the steering switch 28 (step S12). The agent activator 120 activates the agent functional unit 150 identified by the operation determiner 116 on the basis of a notification from the operation determiner 116 (step S14). Then, the processes of the steps S10 to step S16 are repeated until an utterance of the occupant of the vehicle M is detected by the audio processor 112.

On the other hand, the agent activator 120 determines whether the agent functional unit 150 is activated when it is determined that the audio processor 112 detects an utterance of the occupant of the vehicle M (step S18). That is, the agent activator 120 activates the agent functional unit 150 in advance according to execution of an operation on the steering switch 28 and then determines whether an utterance of the occupant of the vehicle M is detected by the audio processor 112. The agent functional unit 150 starts a process according to an utterance of the occupant of the vehicle M when the agent activator 120 determines that the agent functional unit 150 is activated (step S20). Then, the audio processor 112 determines whether the utterance of the occupant of the vehicle M has ended on the basis of a voice signal input through the microphone 10 (step S22). For example, the audio processor 112 determines that the utterance of the occupant of the vehicle M has ended on condition that a predetermined time has elapsed without a voice signal input through the microphone 10 from a time point when an utterance of the occupant of the vehicle M has not been detected. In this case, the predetermined time is set to be longer than an interruption time between successive utterances when the occupant of the vehicle M performs a series of utterances, for example. Then, the audio processor 112 returns to step S10 when it is determined that the utterance of the occupant of the vehicle M has not ended. On the other hand, the audio processor 112 ends the processes of this flowchart when it is determined that the utterance of the occupant of the vehicle M has ended.

Figure 7:
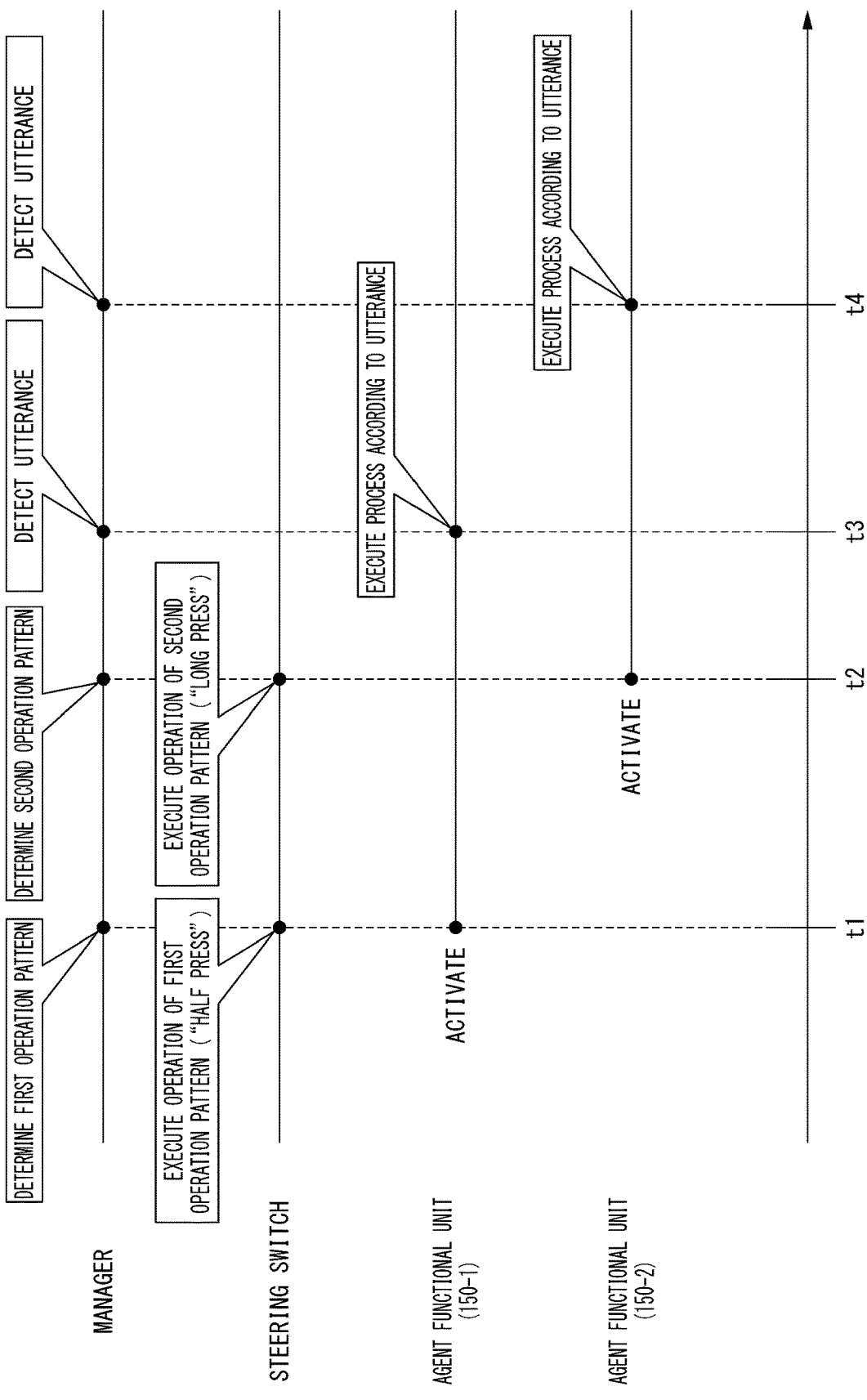
FIG. 7 is a diagram for describing an operation of the on-board agent system according to the first embodiment.

FIG. 7 is a diagram for describing an operation of the on-board agent system VAS according to the first embodiment.

First, the manager 110 activates the agent functional unit 150-1 corresponding to the first operation pattern when it is determined that an operation of the first operation pattern ("half press") is performed on the steering switch 28 at a time t1. Then, the manager 110 activates the agent functional unit 150-2 corresponding to the second operation pattern when it is determined that an operation of the second operation pattern ("long press") is performed on the steering switch 28 at a time t2. Subsequently, when an utterance of the occupant of the vehicle M input from the microphone 10 through the manager 110 is detected at a time t3, the agent functional unit 150-1 executes a process according to the detected utterance. Then, when an utterance of the occupant of the vehicle M input from the microphone 10 through the manager 110 is detected at a time t4, the agent functional unit 150-2 executes a process according to the detected utterance.

Figure 8:
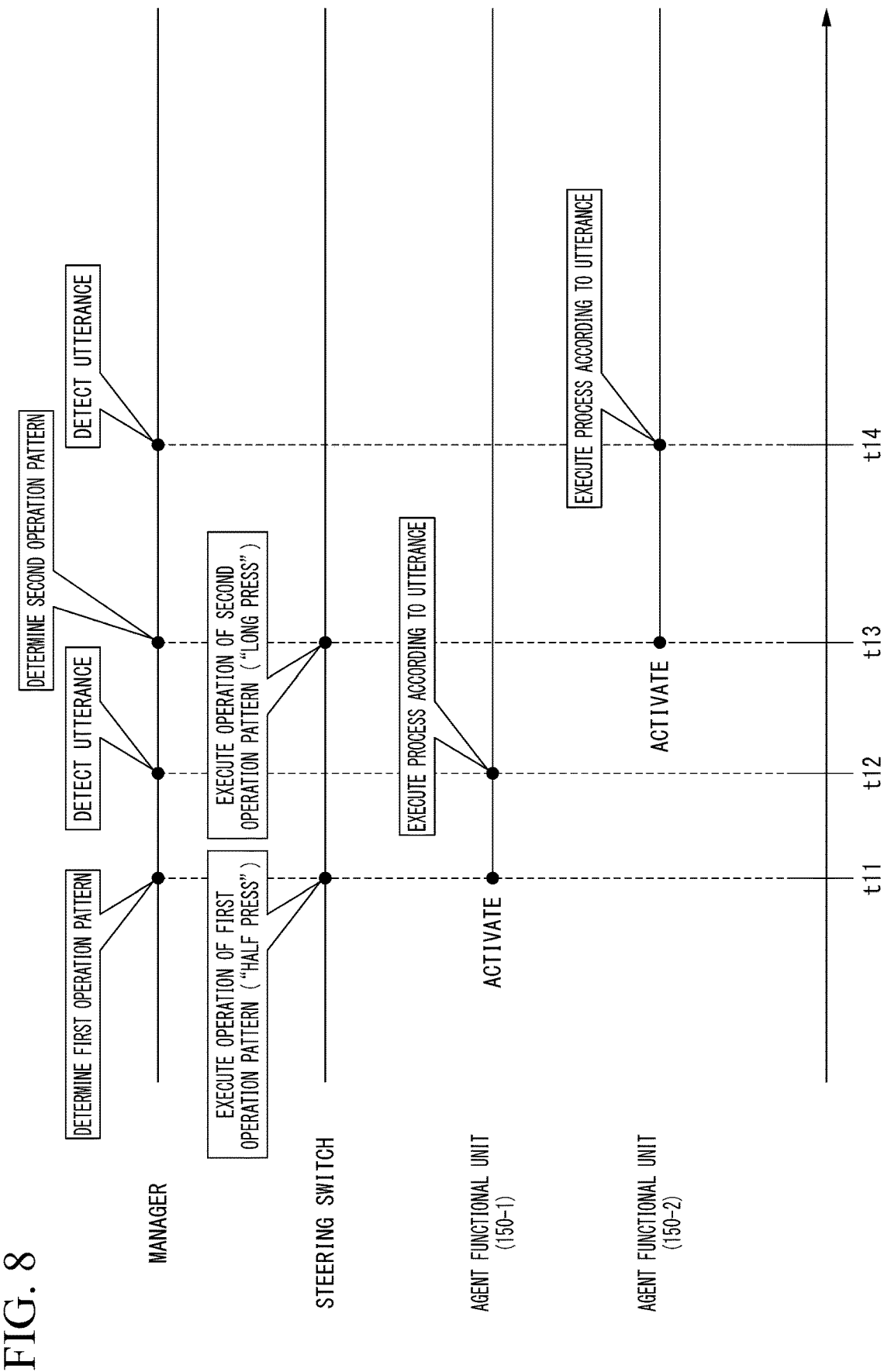
FIG. 8 is a diagram for describing an operation of the on-board agent system according to the first embodiment.

FIG. 8 is a diagram for describing an operation of the on-board agent system VAS according to the first embodiment.

First, the manager 110 activates the agent functional unit 150-1 corresponding to the first operation pattern when it is determined that an operation of the first operation pattern ("half press") is performed on the steering switch 28 at a time t11. Subsequently, an utterance of the occupant of the vehicle M input from the microphone 10 through the manager 110 is detected at a time t12, the agent functional unit 150-1 executes a process according to the detected utterance. Then, the manager 110 activates the agent functional unit 150-2 corresponding to the second operation pattern when it is determined that an operation of the second operation pattern ("long press") is performed on the steering switch 28 at a time t13. Subsequently, when an utterance of the occupant of the vehicle M input from the microphone 10 through the manager 110 is detected at a time t14, the agent functional unit 150-2 executes a process according to the detected utterance.

According to the on-board agent system VAS according to the above-described first embodiment, it is possible to improve convenience. For example, individual wake-up words are set for the plurality of agent functional units 150. In this case, the occupant of the vehicle M needs to successively input the individual wake-up words corresponding to the plurality of agent functional units 150 when the occupant successively activates the plurality of agent functional units 150. In contrast, in the on-board agent system VAS according to the first embodiment, operation patterns of the steering switch 28 which correspond to the plurality of agent functional units 150 are set in addition to the individual wake-up words. Accordingly, the occupant of the vehicle M can successively activate the plurality of agent functional units by switching the operation patterns of the steering switch 28 and thus convenience when the agent functional units 150 are activated can be improved.

According to the on-board agent system VAS according to the above-described first embodiment, it is possible to further improve convenience. For example, when the vehicle M provides a plurality of types of agent functions, use frequencies of the agent functions differ for each occupant of the vehicle M. In contrast, in the on-board agent system VAS according to the first embodiment, when an operation of setting an operation pattern of the steering switch 28 for activating each agent functional unit 150 is input, association of an agent functional unit 150 that is an activation target with an operation pattern of the steering switch 28 is changed. Accordingly, it is possible to associate an operation pattern of the steering switch 28 which has high operability with an agent functional unit 150 which provides a frequently used agent and thus can further improve convenience.

Second Embodiment

Hereinafter, a second embodiment will be described. The second embodiment differs from the first embodiment with respect to a method of forwarding a process of an agent functional unit when an utterance of an occupant of a vehicle is detected. This difference will be chiefly described below.

Figure 9:
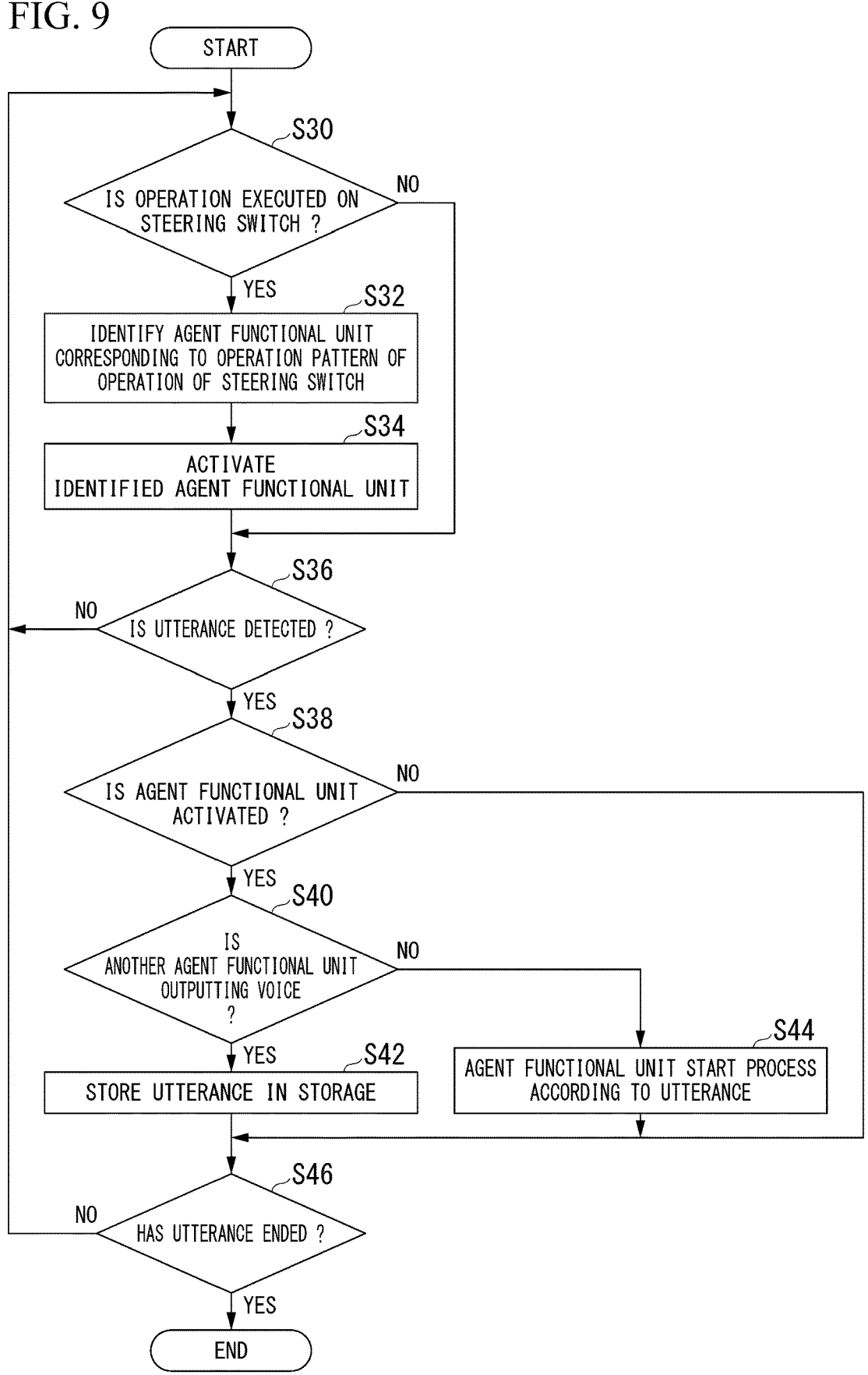
FIG. 9 is a flowchart for describing a flow of a series of processes of an on-board agent system according to a second embodiment.

Hereinafter, a flow of a series of processes of the on-board agent system VAS according to the second embodiment will be described using a flowchart. FIG. 9 is a flowchart for describing the flow of a series of processes of the on-board agent system VAS according to the second embodiment. Processes of this flowchart are started, for example, when activation of the agent functional unit 150 is stopped.

First, the operation determiner 116 determines whether an operation is performed on the steering switch 28 (step S30). The operation determiner 116 identifies an agent functional unit 150 corresponding to the operation pattern of the steering switch 28 with reference to the association information 132 stored in the storage 130 when it is determined that an operation is performed on the steering switch 28 (step S32). Then, the agent activator 120 activates the agent functional unit 150 identified by the operation determiner 116 on the basis of a notification from the operation determiner 116 (step S34). On the other hand, the operation determiner 116 proceeds to step S36 without performing the processes of step S32 to step S34 when it is determined that an operation is not performed on the steering switch 28. Subsequently, the audio processor 112 determines whether an utterance of the occupant of the vehicle M is detected on the basis of a voice signal input through the microphone 10 (step S36). The audio processor 112 returns to step S30 when it is determined that an utterance of the occupant of the vehicle M is not detected. Then, the operation determiner 116 determines whether a new operation is performed on the steering switch 28 (step S30). The operation determiner 116 identifies an agent functional unit 150 corresponding to a new operation pattern of the steering switch 28 with reference to the association information 132 stored in the storage 130 when it is determined that a new operation is performed on the steering switch 28 (step S32). Then, the agent activator 120 activates the agent functional unit 150 identified by the operation determiner 116 on the basis of a notification from the operation determiner 116 (step S34).

On the other hand, the agent activator 120 determines whether the agent functional unit 150 is activated when it is determined that the audio processor 112 has detected an utterance of the occupant of the vehicle M (step S38). That is, the agent activator 120 activates the agent functional unit 150 in advance according to execution of an operation on the steering switch 28 and then determines whether an utterance of the occupant of the vehicle M is detected by the audio processor 112. When it is determined that the agent functional unit 150 is activated, the agent activator 120 determines whether voice is output according to execution of a process by another agent functional unit 150 in response to an utterance of the occupant of the vehicle M (step S40). When it is determined that another agent functional unit 150 is outputting voice, the agent activator 120 stores the utterance of the occupant of the vehicle M detected by the audio processor 112 in the storage 130 (step S42). That is, the agent activator 120 stores the utterance of the occupant of the vehicle M in the storage 130 when an operation is performed on the steering switch 28 while another agent functional unit 150 is outputting voice by the agent activator 120. On the other hand, when it is determined that another agent functional unit 150 is not outputting voice, the agent functional unit 150 starts the process according to the utterance of the occupant of the vehicle M (step S44). Then, the audio processor 112 determines whether the utterance of the occupant of the vehicle M has ended on the basis of a voice signal input through the microphone 10 (step S46). Thereafter, the audio processor 112 returns to step S30 when it is determined that the utterance of the occupant of the vehicle M has not ended. On the other hand, the audio processor 112 ends the processes of this flowchart when it is determined that the utterance of the occupant of the vehicle M has ended.

Figure 10:
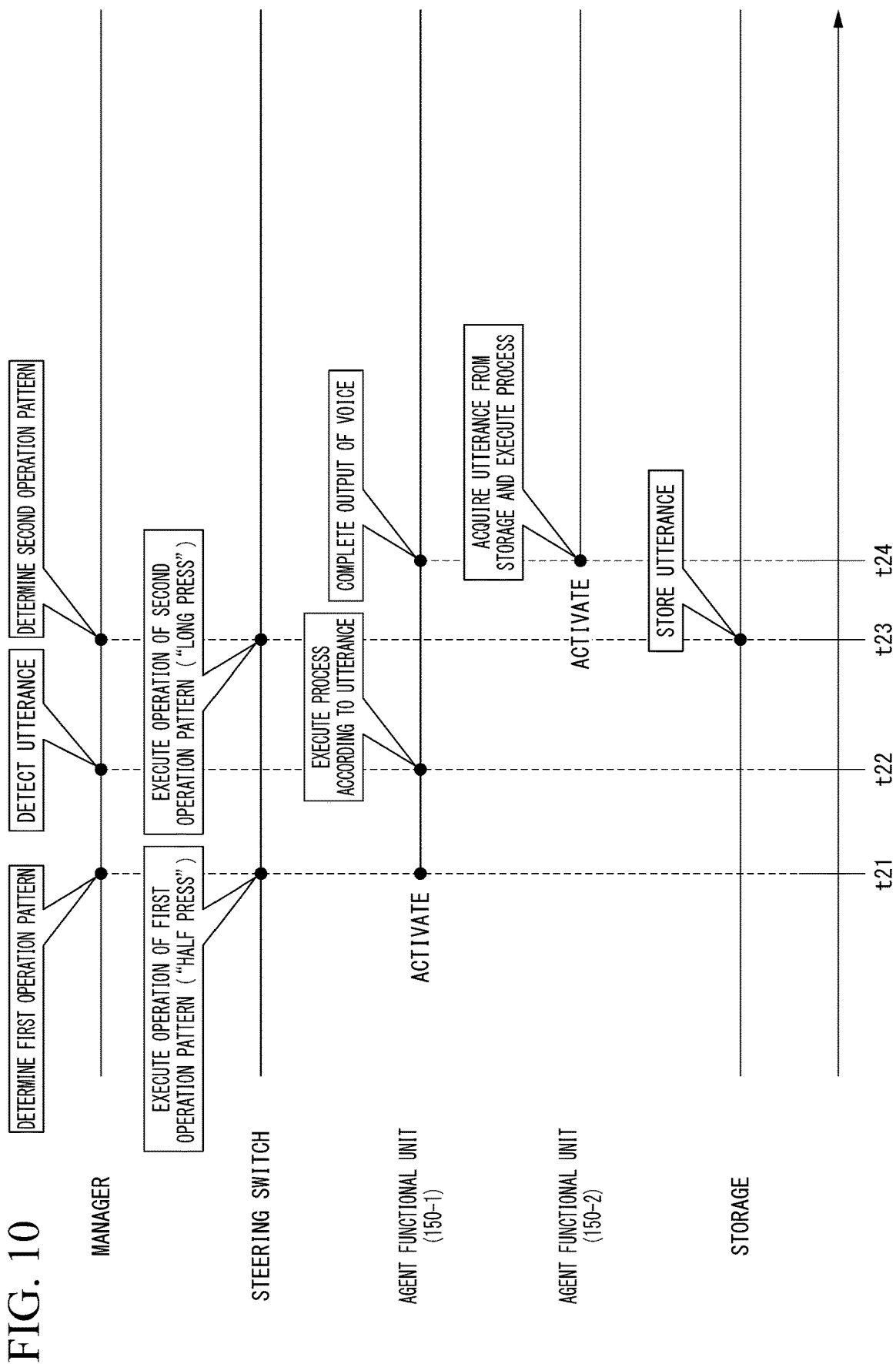
FIG. 10 is a diagram for describing an operation of the on-board agent system according to the second embodiment.

FIG. 10 is a diagram for describing an operation of the on-board agent system VAS according to the second embodiment.

First, the manager 110 activates the agent functional unit 150-1 corresponding to the first operation pattern when it is determined that an operation of the first operation pattern ("half press") is performed on the steering switch 28 at a time t21. Then, when an utterance of the occupant of the vehicle M input from the microphone 10 through the manager 110 is detected at a time t22, the agent functional unit 150-1 executes a process according to the detected utterance. Subsequently, when it is determined that an operation of the second operation pattern ("long press") is performed on the steering switch 28 at a time t23, the manager 110 stores the utterance of the occupant of the vehicle M in the storage 130 because the agent functional unit 150-1 is outputting voice. Thereafter, when the agent functional unit 150 has ended output of the voice at a time t24, the manager 110 activates the agent functional unit 150-2 corresponding to the second operation pattern. Then, the agent functional unit 150-2 acquires the utterance of the occupant of the vehicle M from the storage 130 and executes a process.

According to the on-board agent system VAS according to the above-described second embodiment, it is possible to improve convenience as in the on-board agent system VAS according to the above-described first embodiment. According to the on-board agent system VAS according to the above-described second embodiment, it is possible to further improve convenience as in the on-board agent system VAS according to the above-described first embodiment.

According to the on-board agent system VAS according to the above-described second embodiment, it is possible to further reduce a processing load. For example, when the occupant of the vehicle M switches operation patterns of the steering switch 28, the processing load of the on-board agent system VAS increases when agent functional units corresponding to a plurality of operation patterns start processes in parallel. In contrast, in the on-board agent system VAS according to the second embodiment, when the occupant of the vehicle M switches operation patterns of the steering switch 28, an agent functional unit 150 selected from the plurality of agent functional units 150 starts a process according to an utterance of the occupant of the vehicle M on condition that none of the plurality of agent functional units 150 is executing a process. Accordingly, it is possible to reduce the processing load of the on-board agent system VAS.

Third Embodiment

Hereinafter, a third embodiment will be described. The third embodiment differs from the first embodiment in that the agent functional unit determines an operation pattern of the steering switch. This difference will be chiefly described below.

Figure 11:
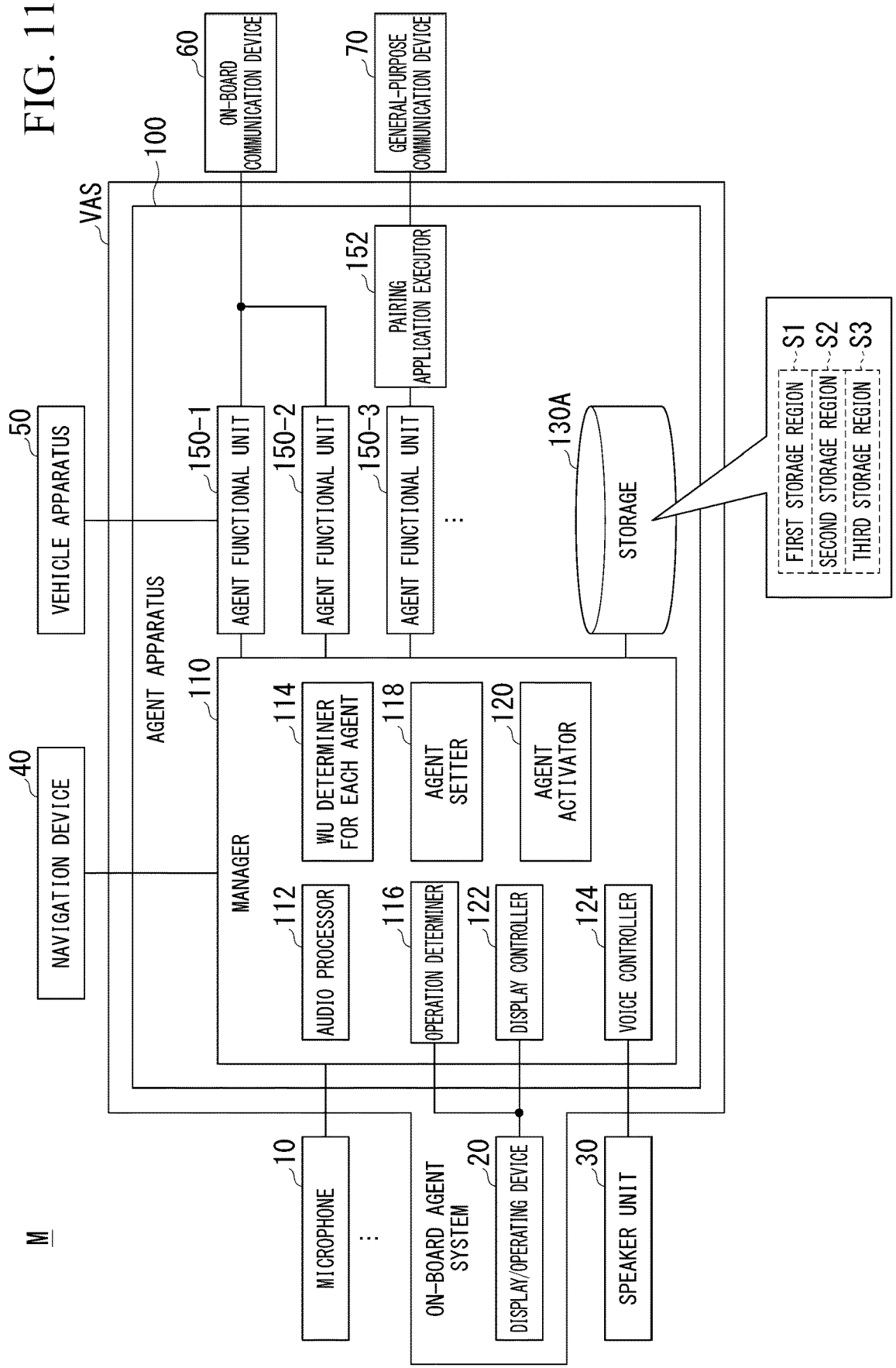
FIG. 11 is a diagram illustrating a configuration of an on-board agent system according to a third embodiment and apparatuses mounted in a vehicle M.

FIG. 11 is a diagram illustrating a configuration of an on-board agent system VAS according to the third embodiment and apparatuses mounted in the vehicle M.

A storage 130A includes a first storage region S1 set to correspond to the agent functional unit 150-1, a second storage region S2 set to correspond to the agent functional unit 150-2, and a third storage region S3 set to correspond to the agent functional unit 150-3. The association information 132 in which the agent functional units 150-1 to 150-3 are associated with operation patterns of the steering switch 28 when the agent functional units 150-1 to 150-3 are activated is stored in the storage regions S1 to S3.

When the occupant of the vehicle M performs an operation on the steering switch 28, the agent functional unit 150 acquires an operation signal output in response to the operation pattern of the steering switch 28 through the manager 110. Then, the agent functional unit 150 determines the operation pattern of the steering switch 28 on the basis of the acquired operation signal. The agent functional unit 150 collates an operation pattern of the steering switch 28 corresponding thereto with the operation pattern of the steering switch 28 determined on the basis of the operation signal with reference to the association information 132 of a storage region corresponding thereto. Then, the agent functional unit 150 activates on condition that collation is established.

FIG. 12 is a diagram for describing an example of the association information 132 stored in the storage regions S1 to S3 of the storage 130A. In the example illustrated in this figure, an operation pattern of "half press" with respect to the steering switch 28 has been associated with "agent 1" corresponding to the first storage region S1 before a setting operation for activating each agent is performed. An operation pattern of "long press" with respect to the steering switch 28 has been associated with "agent 2" corresponding to the second storage region S2. An operation pattern of "two-time press" with respect to the steering switch 28 has been associated with "agent 3" corresponding to the third storage region S3. In addition, in the example illustrated in this figure, the operation pattern of "long press" with respect to the steering switch 28 has been designated for "agent 1" corresponding to the first storage region S1 as an example of the setting operation for activating each agent. In this case, the operation pattern of "long press" with respect to the steering switch 28 is associated with "agent 1" corresponding to the first storage region S1. Before the setting operation is performed, "agent 2" corresponding to the second storage region S2 associated with the operation pattern of "long press" with respect to the steering switch 28 is associated with the operation pattern of "half press" with respect to the steering switch 28 which has been dissociated from an agent. That is, with respect to the plurality of agent functional units 150-1 to 150-3, when the setting operation for an operation pattern of the steering switch 28 for activating each agent functional unit is performed, operation patterns on which the setting operation has been performed are associated with the agent functional units 150-1 to 150-3 that are activation targets and stored in corresponding storage regions in the storage 130A. In view of this, the storage 130A is an example of a "third storage."

Figure 13:
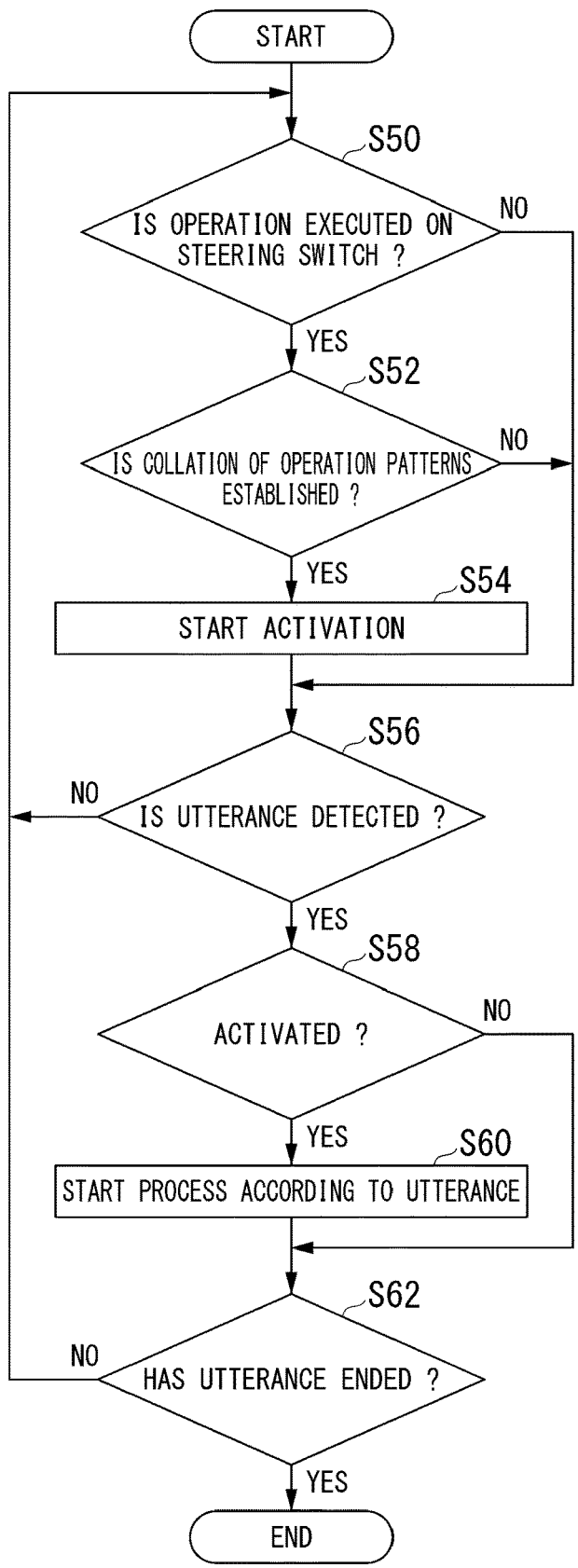
FIG. 13 is a flowchart for describing a flow of a series of processes of the on-board agent system according to the third embodiment.

Hereinafter, a flow of a series of processes of the on-board agent system VAS according to the third embodiment will be described using a flowchart. FIG. 13 is a flowchart for describing the flow of a series of processes of the on-board agent system VAS according to the third embodiment. Processes of this flowchart are started, for example, when activation of the agent functional unit 150 is stopped.

First, the agent functional unit 150 determines whether an operation is performed on the steering switch 28 on the basis of an operation signal of the steering switch 28 acquired through the manager 110 (step S50). The agent functional unit 150 determines an operation pattern of the steering switch 28 on the basis of the acquired operation signal when it is determined that an operation is performed on the steering switch 28. The agent functional unit 150 determines whether collation of an operation pattern of the steering switch 28 which corresponds thereto with the operation pattern of the steering switch 28 determined on the basis of the operation signal is established with reference to the association information 132 of the storage region corresponding thereto in the storage 130A (step S52). The agent functional unit 150 starts activation when it is determined that collation of the operation patterns is established (step S54). On the other hand, the agent functional unit 150 proceeds to step S56 without performing the process of step S54 when it is determined that collation of the operation patterns is not established.

Then, the audio processor 112 determines whether an utterance of the occupant of the vehicle M is detected on the basis of a voice signal input through the microphone 10 (step S56). The audio processor 112 returns to step S50 when it is determined that an utterance of the occupant of the vehicle M is not detected. Then, the agent functional unit 150 determines whether a new operation is performed on the steering switch 28 (step S50). When it is determined that a new operation is performed on the steering switch 28, the agent functional unit 150 determines whether collation between operation patterns is established with reference to the storage 130A (step S52). Then, the agent functional unit 150 starts activation when it is determined that collation of the operation patterns is established (step S54).

On the other hand, the agent functional unit 150 determines whether the agent functional unit 150 is activated when it is determined that the audio processor 112 detects an utterance of the occupant of the vehicle M (step S58). That is, the agent functional unit 150 activates itself in advance according to execution of an operation on the steering switch 28 and then determines whether an utterance of the occupant of the vehicle M is detected by the audio processor 112. When it is determined that the agent functional unit 150 is activated, the agent functional unit 150 starts a process in response to an utterance of the occupant of the vehicle M (step S60). Then, the audio processor 112 determines whether the utterance of the occupant of the vehicle M has ended on the basis of a voice signal input through the microphone 10 (step S62). Thereafter, the audio processor 112 returns to step S50 when it is determined that the utterance of the occupant of the vehicle M has not ended. On the other hand, the audio processor 112 ends the processes of this flowchart when it is determined that the utterance of the occupant of the vehicle M has ended.

Figure 14:
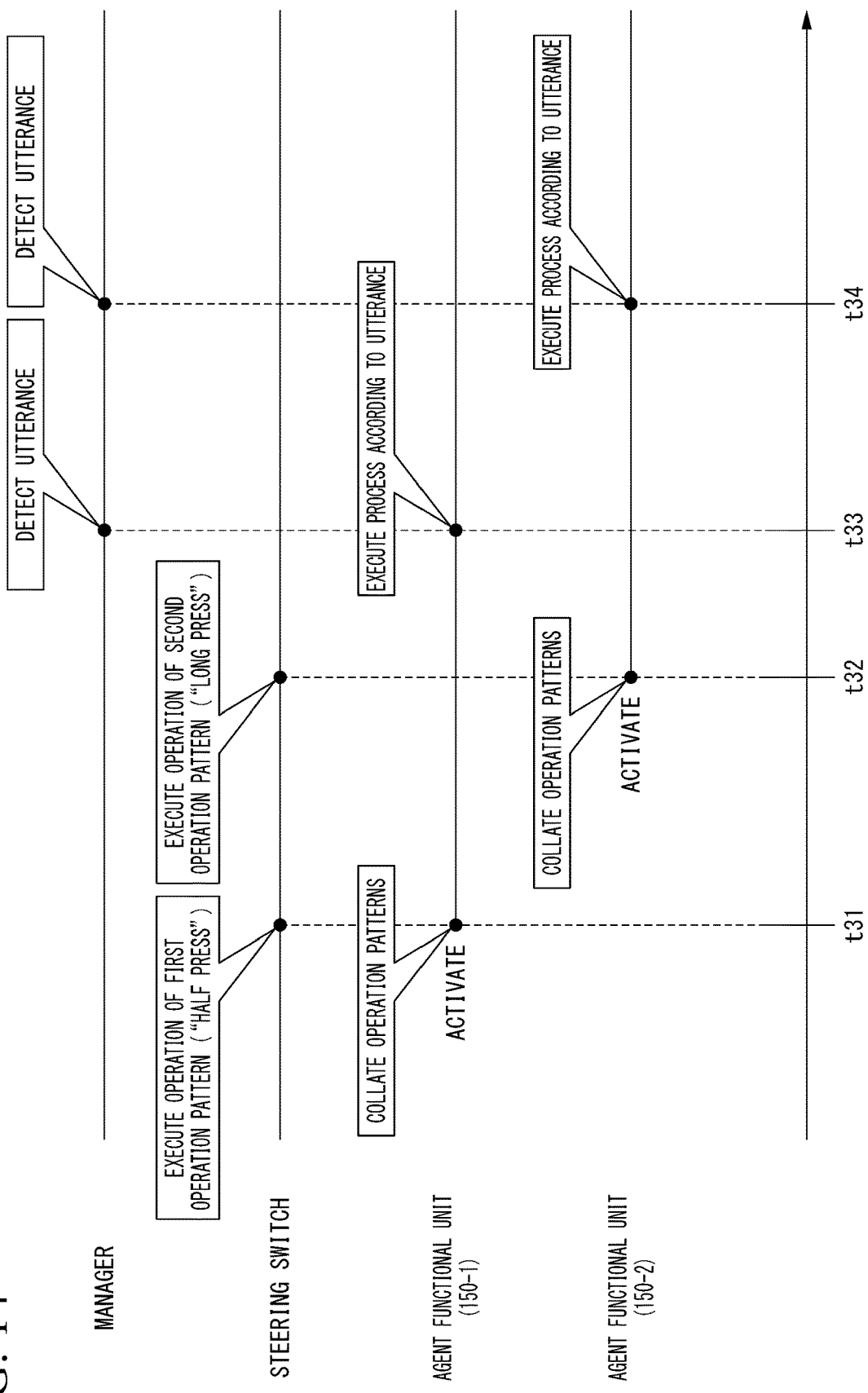
FIG. 14 is a diagram for describing an operation of the on-board agent system according to the third embodiment.

FIG. 14 is a diagram for describing an operation of the on-board agent system VAS according to the third embodiment.

First, the agent functional unit 150-1 determines that collation of the operation pattern corresponding thereto with the first operation pattern is established when it is determined that an operation of the first operation pattern ("half press") is performed on the steering switch 28 and starts activation at a time t31. Then, the agent functional unit 150-2 determines that collation of the operation pattern corresponding thereto with the second operation pattern is established when it is determined that an operation of the second operation pattern ("long press") is performed on the steering switch 28 and starts activation at a time t32. Subsequently, when the agent functional unit 150-1 acquires an utterance of the occupant of the vehicle M including an instruction for the agent functional unit 150-1 through the manager 110 at a time t33, the agent functional unit 150-1 executes a process in response to the acquired utterance. Then, when the agent functional unit 150-2 acquires an utterance of the occupant of the vehicle M including an instruction for the agent functional unit 150-2 through the manager 110 at a time t34, the agent functional unit 150-2 executes a process in response to the acquired utterance.

According to the on-board agent system VAS according to the above-described third embodiment, it is possible to improve convenience as in the on-board agent systems VAS according to the above-described first and second embodiments. According to the on-board agent system VAS according to the above-described third embodiment, it is possible to further improve convenience as in the on-board agent systems VAS according to the above-described first and second embodiments.

While forms for carrying out the present invention have been described using the embodiments, the present invention is not limited to these embodiments at all, and various modifications and substitutions can be made without departing from the gist of the present invention.

What is claimed is:
1. An on-board agent system comprising:
a plurality of agent functional units, each of the plurality of agent functional units being configured to provide a service including outputting a response using voice to an output unit according to an utterance of an occupant of a vehicle; and
a common operator configured to be shared by the plurality of agent functional units and provided in the vehicle,
wherein, when an operation is executed on the common operator with an operation pattern set to correspond to each of the plurality of agent functional units, an agent functional unit corresponding to the operation pattern of the executed operation is activated, and
wherein, when an operation has been executed on the common operator, each of the plurality of agent functional units collates an operation pattern set to correspond to each agent functional unit with an operation pattern of the executed operation and activates on condition that collation is established.
2. The on-board agent system according to claim 1, wherein, when an operation of setting an operation pattern of the common operator for activation of each of the plurality of agent functional units is executed, each of the plurality of agent functional unit stores information about the set operation pattern in a storage, and when an operation is executed on the common operator, determines whether to activate with reference to the information about the operation pattern stored in the storage.
3. An on-board agent system control method, performed by a computer, comprising:
activating any of a plurality of agent functional units;
providing a service including outputting a response using voice to an output unit according to an utterance of an occupant of a vehicle as a function of the activated agent functional unit; and when an operation is executed on a common operator with an operation pattern set to correspond to each of the plurality of agent functional units, activating an agent functional unit corresponding to the operation pattern of the executed operation, and wherein, when an operation has been executed on the common operator, each of the plurality of agent functional units collates an operation pattern set to correspond to each agent functional unit with an operation pattern of the executed operation and activates on condition that collation is established.

4. A computer-readable non-transitory storage medium storing a program causing a computer to execute:

a process of activating any of a plurality of agent functional units;

a process of providing a service including outputting a response using voice to an output unit according to an utterance of an occupant of a vehicle as a function of the activated agent functional unit; and a process of, when an operation is executed on a common operator with an operation pattern set to correspond to each of the plurality of agent functional units, activating an agent functional unit corresponding to the operation pattern of the executed operation, wherein, when an operation has been executed on the common operator, each of the plurality of agent functional units collates an operation pattern set to correspond to each agent functional unit with an operation pattern of the executed operation and activates on condition that collation is established.

* * * * *